United States Patent

Sindano et al.

Patent Number: 5,602,737
Date of Patent: Feb. 11, 1997

[54] METHOD OF AND APPARATUS FOR MONITORING OPERATION OF A CATALYST

[75] Inventors: Hector Sindano, Redditch; Paul W. Birkett, Birmingham, both of England

[73] Assignee: Lucas Industries Public Limited Company, Solihull, England

[21] Appl. No.: 282,483

[22] Filed: Aug. 1, 1994

[30] Foreign Application Priority Data

Jul. 31, 1993 [GB] United Kingdom ............... 9315918

[51] Int. Cl.$^6$ ............................ G06G 7/70; F01N 3/00
[52] U.S. Cl. ............................ 364/431.61; 364/431.03; 364/431.05; 60/274; 60/276; 60/277; 60/285; 123/694; 123/676; 123/674; 73/118.1
[58] Field of Search ................ 364/431.03, 431.06, 364/431.05, 431.04; 60/276, 277, 285, 284, 286, 300, 301, 274, 288, 328, 289, 311, 290, 293; 123/696, 703, 674, 691, 681, 680, 682, 683, 692, 688, 676, 694, 326; 73/118.1, 117.3, 116

[56] References Cited

U.S. PATENT DOCUMENTS 5,343,701  9/1994  Douta et al. ..................... 60/276
5,417,061  5/1995  Maeda et al. .................... 60/277

Primary Examiner—Kevin J. Teska
Assistant Examiner—Jacques Louis-Jacques
Attorney, Agent, or Firm—Jacobson, Price, Holman & Stern, PLLC

[57] ABSTRACT

The operation of a catalyst can be monitored using a two part test. An engine management system is arranged to perturb the oxygen concentration of the exhaust gas of an internal combustion engine such that an oxygen concentration of the gas entering the catalyst varies between oxygen rich and oxygen deficient. A first test involves counting the number of transitions of the gas leaving the catalyst between two predetermined oxygen concentrations in response to a predetermined number of transitions of the gas entering the catalyst. A second test is performed if the first test indicates the catalyst to be faulty. The second test involves forming an integral of the oxygen concentration of the gas leaving the catalyst and correcting the integral for gas flow through the catalyst.

11 Claims, 5 Drawing Sheets

METHOD OF AND APPARATUS FOR MONITORING OPERATION OF A CATALYST

The present invention relates to a method of and apparatus for monitoring the operation of a catalyst. The catalyst may, for example, be included within the exhaust system of an internal combustion engine.

According to a first aspect of the present invention there is provided a method of monitoring operation of a catalyst, comprising perturbing the oxygen concentration of gas entering the catalyst such that the oxygen concentration varies between first and second concentrations, forming an integral of the oxygen concentration of the gas leaving the catalyst during a period in which the oxygen concentration of the gas leaving the catalyst varies between a third concentration and a fourth concentration in response to the perturbation, forming a measure of gas flow through the catalyst during the integration and correcting the result of the integration for gas flow so as to provide a measure of performance of the catalyst.

It is thus possible to provide a measure of the ability of a catalyst to store oxygen and to correct this measure for changes in exhaust gas flow rate due to engine speed and load.

Preferably the catalyst is a three-way catalyst.

Advantageously an engine management system is arranged to perturb the air-fuel ratio of the engine such that the oxygen concentration of the gas entering the catalyst repeatedly alternates between the first and second oxygen concentrations.

Preferably the measurement of the oxygen concentration of gas leaving the catalyst is clamped between upper and lower thresholds.

Preferably the upper threshold is less than the third concentration.

Advantageously the integration may be initiated on the transition of the gas entering the catalyst from being oxygen rich to being oxygen deficient.

As an alternative, the time taken for the oxygen concentration of the gas leaving the catalyst to change between the third and fourth concentrations may be used as an integral of the oxygen concentration of the gas leaving the catalyst.

A first embodiment of the method of monitoring the performance of a catalyst, may comprise:

a first step of integrating the oxygen concentration of gas leaving the catalyst while the oxygen concentration of gas entering the catalyst is less than a first predetermined threshold;

a second step of repeating step one for a predetermined number of transitions of the oxygen level of the gas leaving the catalyst from the third concentration to the fourth concentration, summing the integrals to form a first sum, correcting the first sum for engine load so as to form a corrected value and subtracting the corrected value from a first predetermined value to form a first difference; repeating the first and second steps a predetermined number of times and forming a sum of the first differences greater than a first predetermined threshold to form a second sum; and comparing the second sum with a second predetermined threshold and indicating the catalyst to be faulty if the second sum exceeds the second predetermined threshold.

Preferably the first predetermined threshold is zero.

Preferably the monitoring of catalyst performance is only initiated when predetermined engine operating conditions are satisfied.

Preferably the first concentration is larger than the second concentration.

Preferably the predetermined conditions are such that the engine is not in over-run or such that fuelling has been temporarily suspended. Furthermore the rate of change of engine intake air flow should be less than a predetermined rate of change. Additionally engine load should be substantially steady, i.e. electrical or other loads internal to or powered by the vehicle, such as air conditioning, should not be switching on or off. Furthermore, a traction control system, if fitted, should not be intervening to perform traction control.

Advantageously a settling time may be allowed if the engine control system is responsive to one of first and second sensors provided down-stream and up-stream of the catalyst, respectively, for monitoring oxygen concentration and the sensor to which the engine control is responsive has recently been changed from one sensor to the other.

Preferably the output of a first sensor is clamped between a first limit and a second limit greater than the first limit. Advantageously the output of the second sensor is clamped between a third limit and a fourth limit. Preferably the sensors are lambda sensors.

Preferably the output of the first sensor when clamped is used to form the integral. Preferably the first and second limits correspond to the lower and upper thresholds, respectively.

According to a second aspect of the present invention there is provided a method of monitoring operation of a catalyst, comprising a first step of forming a difference between a number of first transitions of the oxygen concentration of gas entering the catalyst between the first concentration and the second concentration and a number of second transitions of the oxygen concentration of gas leaving the catalyst between the third concentration and the fourth concentration, comparing the difference with a third predetermined threshold when a predetermined number of the first transitions have occurred, and initiating the method according to the first aspect of the present invention when the difference is less than the third predetermined threshold.

It is thus possible to provide a two part test of catalyst performance. A first test counts the difference between transitions in oxygen concentration up-stream and down-stream of the catalyst. A good catalyst will give rise to a big difference whereas a poor catalyst will give rise to a small or zero difference. If the first test suggests that catalyst performance is poor, then the test of the first aspect of the invention is started.

Preferably the first transitions which are counted are transitions of the gas entering the catalyst from being oxygen deficient to being oxygen rich.

Preferably the second transitions which are counted are transitions of the gas leaving the catalyst from being oxygen deficient to being oxygen rich.

Alternatively, the first and second transitions may be transitions of the gas entering and leaving the catalyst, respectively, from being oxygen rich to being oxygen deficient.

According to a third aspect of the present invention there is provided an apparatus for monitoring operation of a catalyst, comprising a first sensor down-stream of the catalyst for monitoring an oxygen concentration of gases leaving the catalyst, a second sensor up-stream of the catalyst for monitoring an oxygen concentration of gases entering the catalyst, gas flow estimating means for estimating the gas flow through the catalyst and a data processor arranged to monitor outputs of the first and second sensors, to form an integral of the oxygen concentration of gas leaving the catalyst during a period in which the oxygen concentration of the gas leaving the catalyst varies between a third concentration and a fourth concentration in response to the oxygen concentration of the gas entering the catalyst varying between a first concentration and a second concentration, and to correct a result of the integration for gas flow so as to provide a measure of performance of the catalyst.

Preferably the catalyst is a three-way catalyst.

Preferably, an engine management system perturbs the amount of fuel introduced into the engine so that the catalyst receives, alternately, an air-rich combusted mixture and an air deficient combusted mixture. Such a fuelling strategy is required to operate the catalyst correctly.

Preferably the sensors are lambda sensors.

Preferably the data processor is arranged to monitor engine operation so as to determine that predetermined engine operating conditions are satisfied, and to start the monitoring of the catalyst when such predetermined conditions are satisfied.

In a first embodiment of an apparatus for monitoring the performance of a catalyst, the data processor may be arranged to integrate the output of the first sensor while the output of the first sensor is greater than a first predetermined sensor output value and the output of the second sensor is below a second predetermined sensor output value indicating that the gas entering the catalyst is oxygen deficient. The data processor may further be arranged to repeat the integration for a predetermined number of integrations, to form an average and to correct the average for gas flow through so as to provide a measure of the operation of the catalyst.

Advantageously the data processor may repeat the integration and averaging and correction a plurality of times so as to form a plurality of corrected values, each of the corrected values being subtracted from a first predetermined value to form a plurality of first differences, the data processor may then sum those first differences greater than a first predetermined threshold so as to form a second sum and compare the second sum with a second predetermined threshold and indicate the catalyst to be faulty when the second sum exceeds the second predetermined threshold.

Preferably the data processor is further arranged to clamp the output of the first sensor between the first level and the second level greater than the first level. Advantageously the data processor is further arranged to clamp the output of the second sensor between a third level and a fourth level greater than the third level.

Preferably the data processor is arranged to integrate the clamped output of the first sensor.

Preferably the data processor is arranged to monitor engine operation so as to determine that predetermined engine operating conditions are satisfied, and to start the integration where such predetermined conditions are satisfied.

According to a fourth aspect of the present invention there is provided an apparatus for monitoring operation of a catalyst, comprising an apparatus according to the third aspect of the present invention, the data processor being arranged to perform a first test of forming a difference between a number of first transitions of the oxygen concentration of gas entering the catalyst between the first concentration and the second concentration and a number of second transitions of the oxygen concentration of the gas leaving the catalyst between a third concentration and a fourth concentration, to compare the difference with a third predetermined threshold when a predetermined number of first transitions have occurred, and to initiate a test involving forming integrals of the oxygen concentration of the gas leaving the catalyst, as described in the third aspect of the present invention, when the difference is less than the third predetermined threshold.

The present invention will further be described, by way of example, with reference to the accompanying drawings, in which:

DESCRIPTION OF THE PREFERRED EMBODIMENTS

Figure 1:
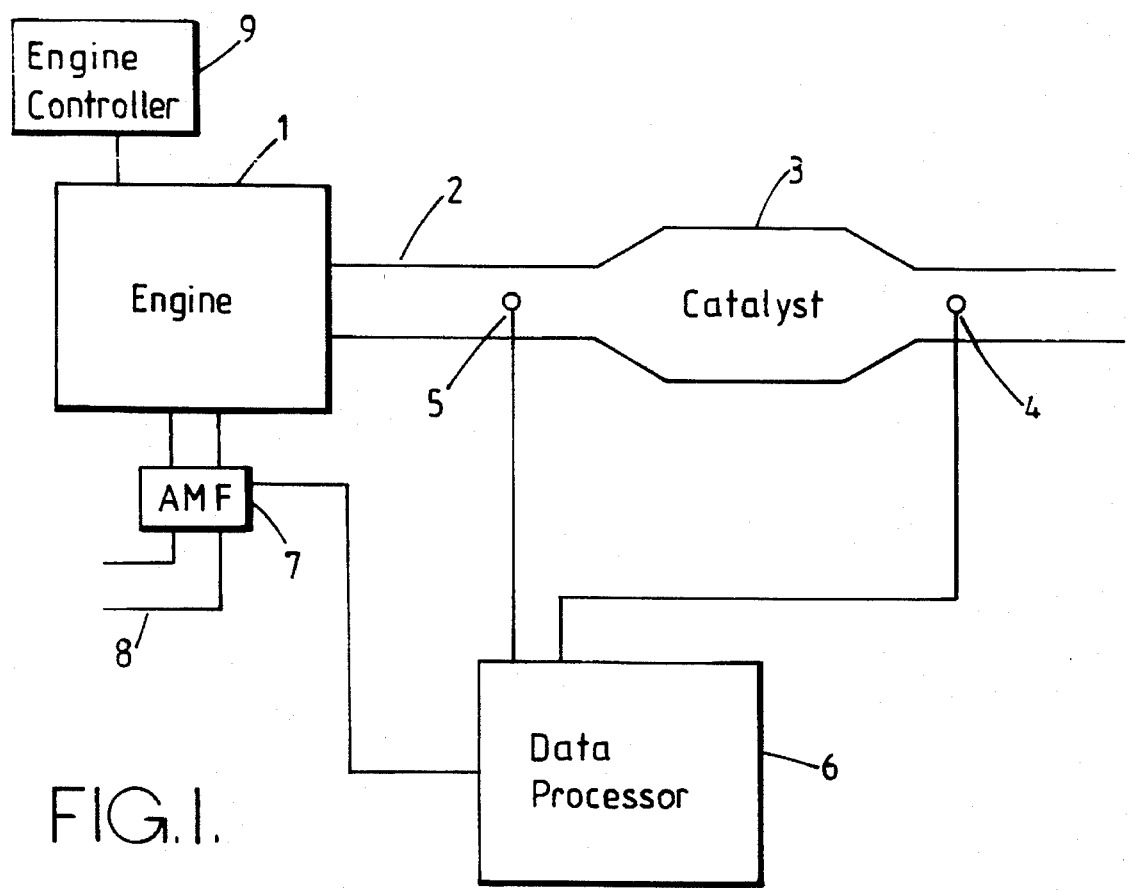
FIG. 1 is a schematic diagram of an exhaust system of an internal combustion engine.

A spark ignition internal combustion engine 1 has an exhaust system 2 including a catalytic converter 3, as shown in FIG. 1. A first lambda sensor 4 is situated down-stream of the catalytic converter 3. A second lambda sensor 5 is situated up-stream of the catalytic converter 3. A first output of the first sensor 4 is connected to a first input of a data processor 6. A first output of the second sensor 5 is connected to a second input of the data processor 6. An air-mass flow (AMF) measuring device 7 is provided to measure air flow within an induction system 8 of the engine 1. An output of the air-mass flow measuring device 7 is connected to a third input of the data processor 6.

The lambda sensors 4 and 5 measure the oxygen content of the exhaust gases down-stream and up-stream of the catalytic converter, respectively. The outputs of the sensors are monitored by the data processor 6 so as to periodically check the function of the catalytic converter. During engine operation, an engine controller 9 dithers the engine fuelling i.e. periodically varies the air/fuel ratio above and below the stoichiometric value, so as to control the amount of oxygen in the exhaust gas such that the catalytic converter 3 alternately performs oxidation and reduction of the pollutants within the exhaust gas.

The signals from the lambda sensors vary in response to the dithering of the fuelling. The output of the second sensor 5 closely follows the changes in the fuelling, as is indicated by the substantially square wave shaped signal labelled "sensor 2" of FIG. 2. The output of the first sensor, labelled "sensor 1", indicates the oxygen content in the exhaust gas down-stream of the catalyst and is delayed with respect to the signal of the second sensor due to gas travel time through and oxygen storage capacity of the catalytic converter.

Figure 3:
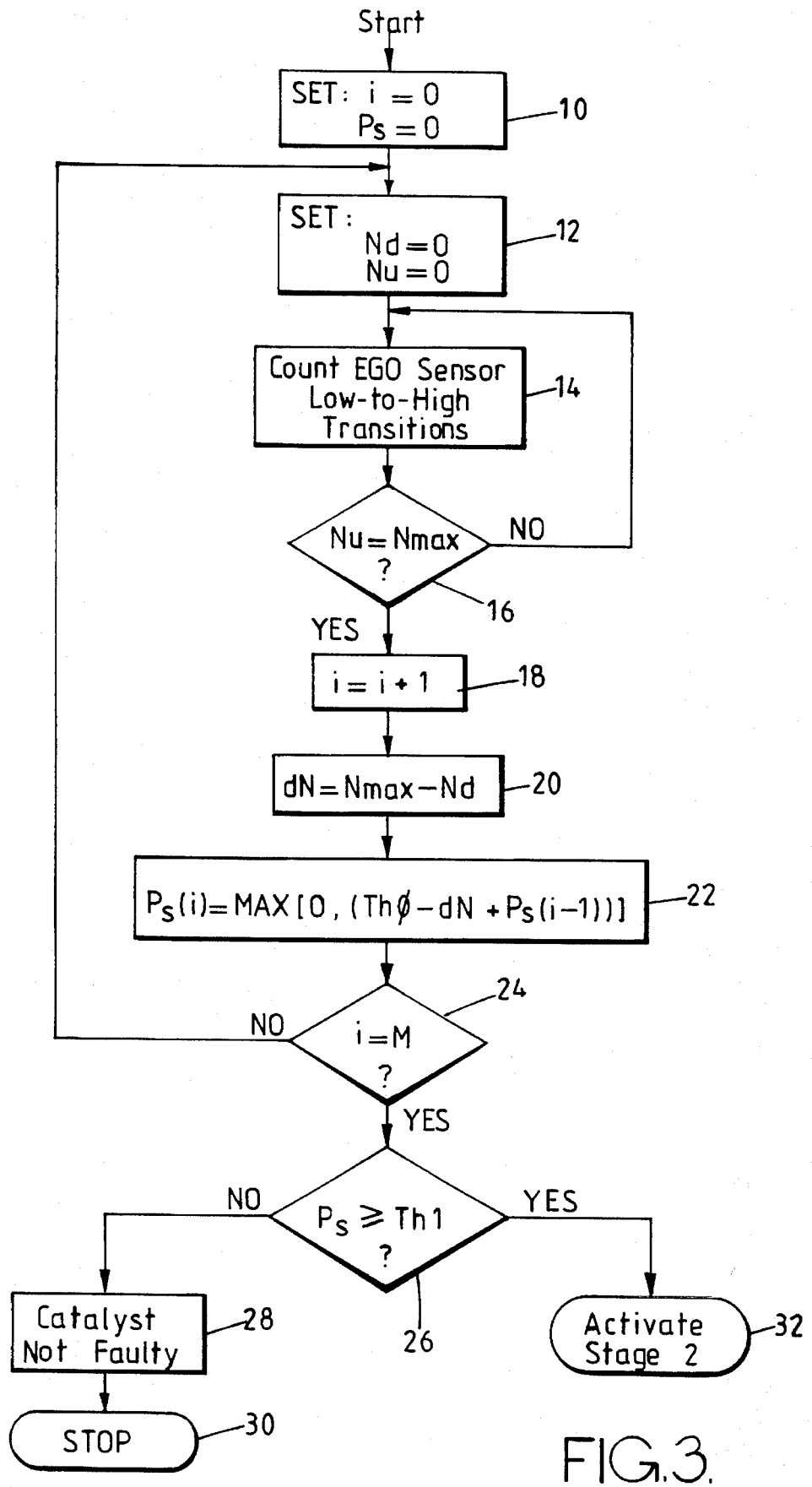
FIG. 3 is a flow chart illustrating the operations for performing a first test of a catalyst.
Figure 4:
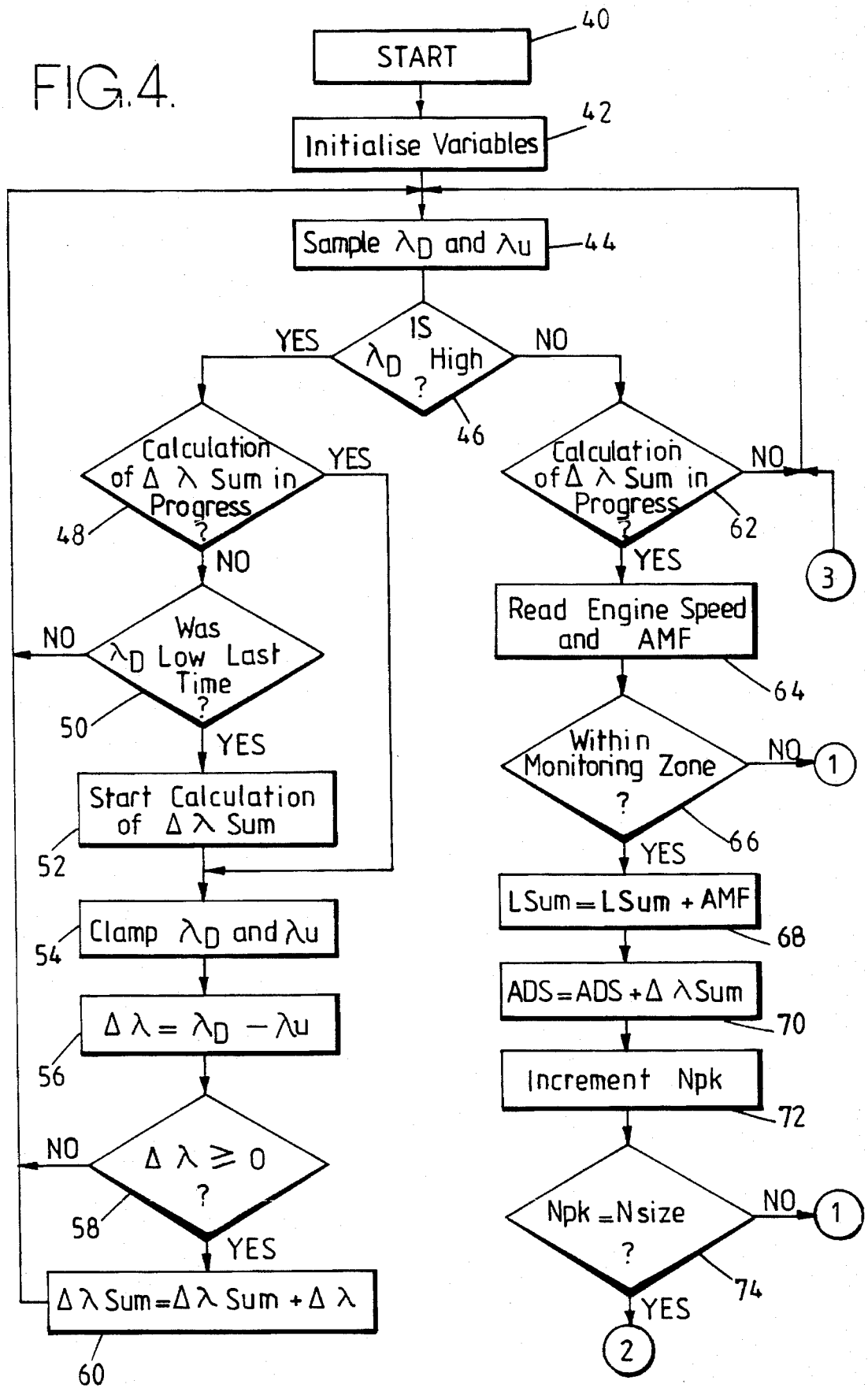
FIG. 4 is a flow chart illustrating the operations for performing a second test of a catalyst.

The data processor, which may be integral with an engine management system, checks the status of the engine management system so as to determine if the engine is being operated in near steady state conditions. That is to say, measurement of the performance of the catalytic converter 3 is not performed if the engine is in overrun, is in a fuel cut off mode, is subjected to abruptly varying load, is or has recently changed gear, has a rate of change of intake air flow above a predetermined threshold or is being controlled to perform traction control. If none of the above events is happening, the data processor performs the first test, as illustrated by the flow chart of FIG. 3.

A variable i representing the number of iterations performed, and a variable Ps representing a measure of the health of the catalyst in the catalytic converter 3 are set to zero at step 10. Similarly two counters Nu and Nd are reset at step 12. The counters Nu and Nd represent the number of times the voltages from the second and first lambda sensors 5 and 4 make transitions from respective low thresholds to respective high thresholds, although transitions from respective high thresholds to low thresholds could be counted. The number of voltage transitions for each sensor is counted at step 14, and step 16 causes step 14 to be repeated until the number of transitions made by the second sensor 5 is equal to a predetermined value, Nmax. Nmax typically has a value of ten. Control is then passed to step 18, where the variable i is incremented, and step 20 where a difference dN is formed by subtracting Nd from Nmax.

Each value of dN is subtracted, at step 22, from a predetermined value Th0, which may be chosen to be approximately half Nmax, to obtain a difference which is an ith iteration's contribution to Ps. Each contribution to Ps is summed with the preceding contributions. However, Ps is constrained to be equal to or greater than zero. Control is then passed to step 24 which determines whether a predetermined number of iterations, set in a value M and typically 20, has been completed. Control is passed to step 12 if further iterations are required; otherwise control is passed to step 26 where Ps is compared with a threshold Th1, for example, Th1 is typically 60 if Nmax is equal to 10. If Ps is less than Th1, step 28 is executed whereby a flag is set to indicate that the catalyst is functioning properly. The test is then terminated at step 30. If Ps is greater than or equal to Th1, control is passed to step 32 which initiates a second stage test.

The first test is relatively simple and does not demand much processing power. However, the first stage test may be omitted.

The second stage test provides a more sophisticated analysis of the performance of the catalytic converter 3. The test effectively forms an integral of the hatched regions of FIG. 2 as a measure of the performance of the catalyst 3.

Execution of the second stage begins at step 40. The same near steady state conditions are required as for the first test. Step 42 initialises variables, after which the outputs $\lambda u$ and $\lambda d$ of the second and first sensors 5 and 4, respectively, are sampled at step 44. The value of the output $\lambda d$ of the first sensor is compared with a low threshold value at step 46. If the output $\lambda d$ of the first sensor 4 is greater than the lower threshold, i.e. $\lambda d$ is high, control is passed to step 48. Otherwise control is passed to step 62.

Figure 2:
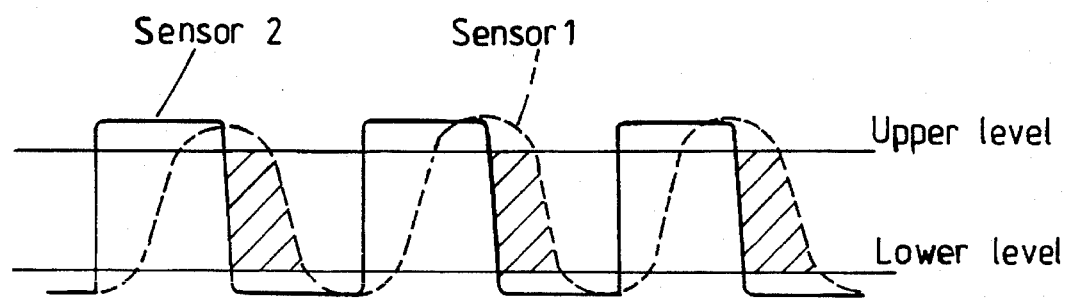
FIG. 2 is an exemplary diagram of the output signals from the sensors shown in FIG. 1.

Step 48 performs an internal check to see if calculation of a variable $\Delta\lambda$sum is in progress. If the calculation of $\Delta\lambda$sum is in progress, control is passed to step 54. Otherwise control is passed to step 50. Step 50 checks the previous value of the output $\lambda d$ of the first sensor 4. Control is passed to step 44 if the previous value was high. Otherwise control is passed to step 52 which initiates the calculation of $\Delta\lambda$sum and then passes control to step 54. The values of the outputs $\lambda u$ and $\lambda d$ of the second and first lambda sensors are constrained to lie between upper and lower limits at step 54 (as illustrated in FIG. 2) and then the difference $\Delta\lambda=\lambda d-\lambda u$ is formed at step 56. Step 58 tests $\Delta\lambda$ to see if it is greater than or equal to zero. Control is passed to step 60 if $\Delta\lambda$ is greater than or equal to zero, where $\Delta\lambda$ is added to the current value of $\Delta\lambda$sum. Otherwise control is returned to step 44.

Figure 5:
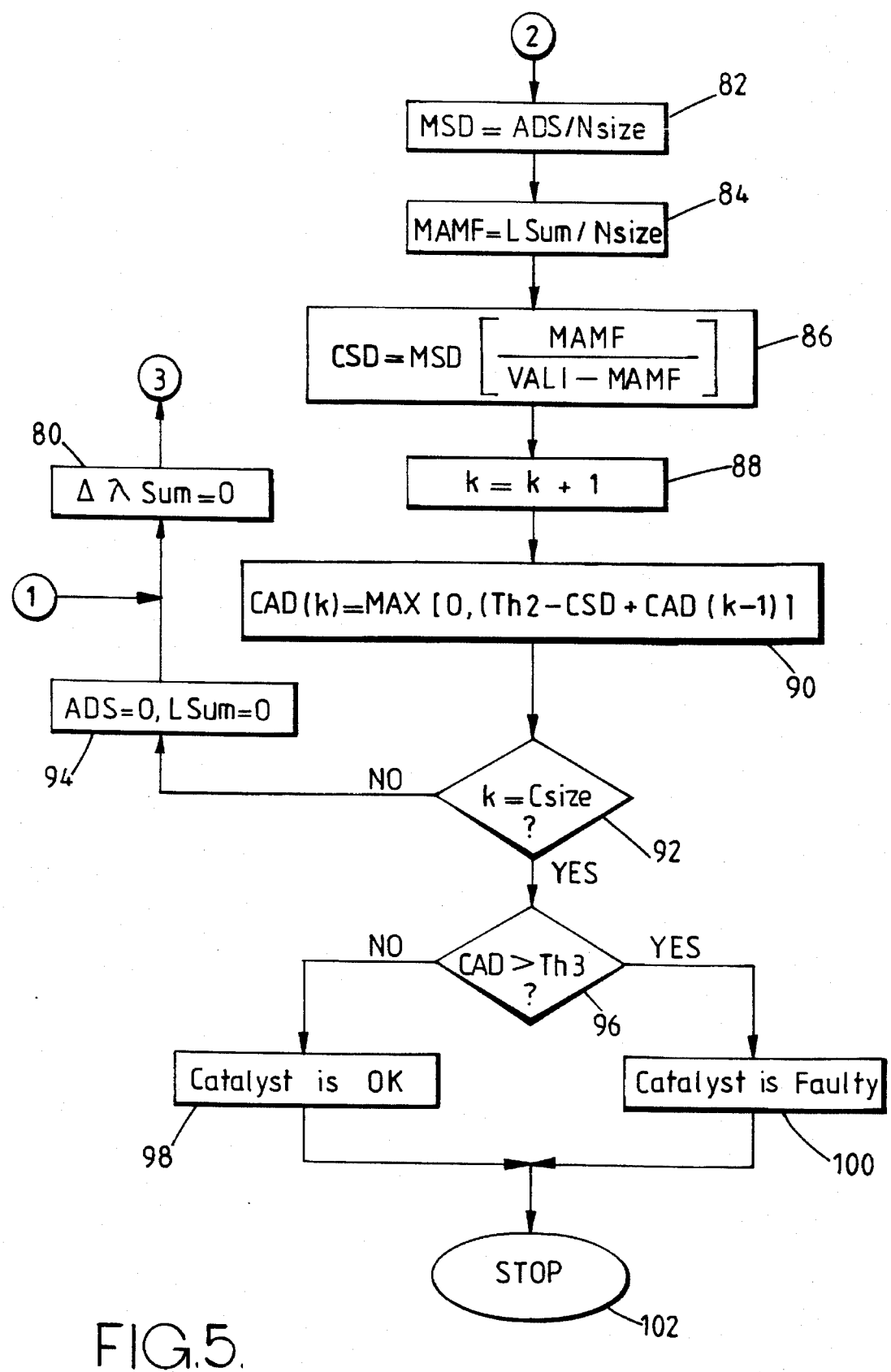
FIG. 5 is a continuation of the flow chart of FIG. 4.

If step 46 determined that the output $\lambda d$ of the first sensor 4 is not greater than the lower threshold, control was passed to step 62. Step 62 performs an internal check to see if calculation of the variable $\Delta\lambda$sum is in progress. If the calculation of $\Delta\lambda$sum is in progress, control is passed to step 64. Otherwise control is passed to step 44. Steps 64 and 66 retrieve, and then examine, parameters indicative of the engine operation condition and check to see that the near steady state conditions required for performing the test are still satisfied, i.e. engine operation is within an acceptable "monitoring zone". If the test for near steady state conditions is not satisfied, control is passed to step 80 (FIG. 5). Otherwise control is passed to step 68. Step 68 updates a variable Lsum, which represents a sum of the air mass flow with a measurement of intake air mass flow AMF for the period over which the measurements (of the shaded areas shown in FIG. 2) were made.

Step 70 adds the value $\Delta\lambda$sum determined during the most recent period of summing to a variable ADS which is a sum of all the $\Delta\lambda$sum performed with the current test. Step 72 increments a variable Npk which is a count of the number of measurements which have been made. For, example, FIG. 2 shows three shaded areas, a value $\Delta\lambda$sum would be calculated for each of the shaded areas and in this example Npk would equal 3 when the summation of the third shaded area was completed. Step 74 checks to determine whether or not Npk is equal to a predetermined value Nsize. Nsize is an integer and may, for example, be set to five. If Npk does not equal Nsize, control is passed to step 80 of FIG. 5, otherwise control is passed to step 82 of FIG. 5.

Step 80 resets $\Delta\lambda$sum to zero and then passes control back to step 44, so that the measurement sequence can be continued.

Step 82 forms a mean MSD of the sums of $\Delta\lambda$sum, i.e. a mean measurement of the shaded area shown in FIG. 2, by dividing ADS by Nsize. Step 84 calculates a mean air mass flow rate MAMF for the period over which the measurements (of the shaded areas shown in FIG. 2) were made. MSD is corrected for engine load at step 86 by forming a corrected sum CSD where $$CSD = MSD \left[ \frac{MAMF}{Val1 - MAMF} \right]$$

Val1 is set to a value which ensures that the denominator never becomes zero.

A variable K, representing the number of completed iterations is incremented at step 88. At step 90 a variable CAD, which is updated at each iteration, is calculated as $$CAD(k)=Th2-CSD+CAD(k-1).$$

Thus the value (Th2–CSD) is added to the previous value of CAD at each iteration. Th2 is a threshold whose value represents an approximate limit of acceptability of CSD. Thus good catalysts result in (Th2–CSD) being negative while bad catalysts give a positive result.

The value of CAD(k) is clamped such that it is never less than zero.

Step 92 compares the value K with a value Csize, representing the number of iterations that are to be performed before the test is completed. If K is less than Csize, control is passed to step 94, where ADS is reset to zero, then to step 80 and hence on to step 44 such that another iteration is initiated. Control is passed from step 92 to step 96 if K equals Csize. Step 96 compares the final value of CAD with a threshold Th3. If CAD is greater than Th3, control is passed to step 100, where a flag is set to indicate that the catalyst is faulty. Otherwise control is passed to step 98 where a flag is set to indicate that the catalyst is working correctly. The test is terminated at step 102.

Figure 6:
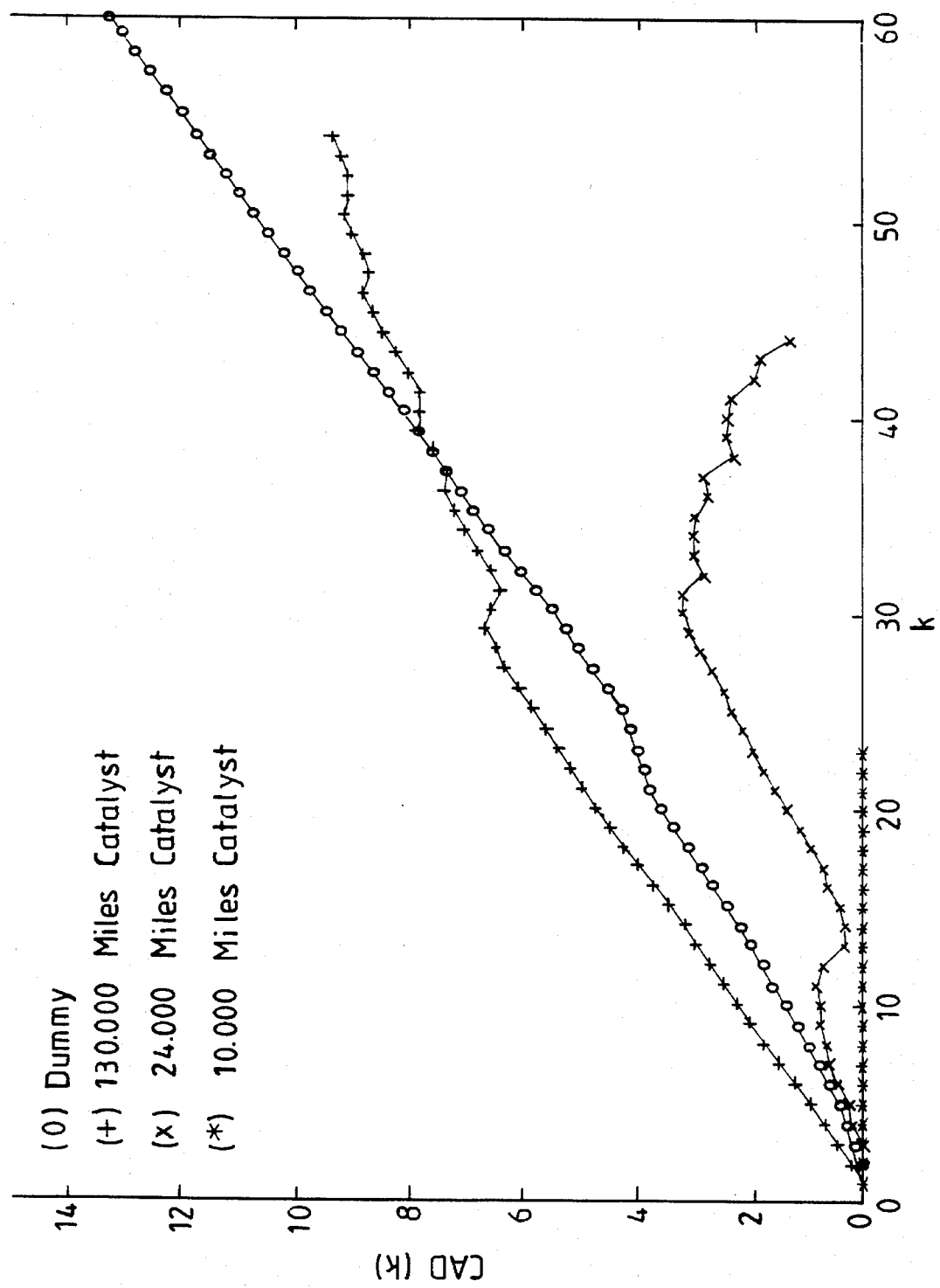
FIG. 6 is a graph of test results.

FIG. 6 shows a graph of CAD(k) versus k, where k is the number of iterations, for a catalyst (*) which has been in use with a vehicle for 10,000 miles, for a catalyst (x) which has been in use with a vehicle for 24,000 miles, for a catalyst (+) which has been in use with a vehicle for 130,000 miles, and for a dummy (o) which had the internal structure of the catalyst but no precious metal coating so as to activate the catalyst.

The 10000 mile catalyst has a value near zero for each iteration, indicating the catalyst to be in good condition. The 24000 mile catalyst has a value of CAD which peaks at about 3.2, also indicating the catalyst to be in good condition. The value of CAD for the 130000 mile catalyst rises, almost steadily, with increasing number of iterations. This catalyst is not functioning correctly and should be replaced. The dummy initially performs better than the 130000 mile catalyst. It would seem reasonable to expect that the 130000 mile catalyst should perform no worse that the dummy. However, the dummy contains all the elements of a catalyst except for the activating layer. Thus the dummy has a limited converting activity and demonstrates some oxygen storage capacity. It is believed that this difference in condition may account for the relative performance of the dummy with respect to the 130000 mile catalyst.

The value of Th3 is chosen so as to distinguish between good and bad catalysts, for example, on the basis of the data presented in FIG. 6, a value of 2.5 for 20 iterations, or 4 for 30 iterations, may be chosen as the value for Th3.

It is thus possible to monitor the operation of a catalyst in an exhaust system of an internal combustion engine. A first check is provided that is simple to implement and provides a rough indication of the state of the catalyst. A second, more thorough check is provided that provides a quantative indication of the state of the catalyst. Execution of the second check may be performed only when the first check fails, thereby reducing the computational load on the data processor. However, the first check may be omitted.

We claim:

1. A method of monitoring operation of a catalyst acting on an exhaust gas of an internal combustion engine, said method comprising the steps of:

(a) perturbing an oxygen concentration of the exhaust gas entering the catalyst between a first oxygen rich concentration and a second oxygen deficient concentration;

(b) forming an integral of the oxygen concentration of the exhaust gas leaving the catalyst during a period starting when the oxygen concentration of the exhaust gas entering the catalyst changes from the first oxygen rich concentration to the second oxygen deficient concentration and ending when the oxygen concentration of the exhaust gas leaving the catalyst falls below a third oxygen deficient concentration;

(c) forming a measure of flow of the exhaust gas through the catalyst during the period in which the integral is being formed; and (d) correcting the integral for the measure of the exhaust gas flow so as to provide a measure of the performance of the catalyst;

wherein the exhaust gas of the internal combustion engine is controlled by an engine management system such that the oxygen concentration of the exhaust gas entering the catalyst repeatedly alternates between the first and second oxygen concentrations.

2. A method as claimed in claim 1, in which a measurement of the oxygen concentration of the gas leaving the catalyst is constrained to lie between upper and lower thresholds.

3. A method as claimed in claim 1, in which said performance of the catalyst is only measured when an engine load is substantially constant.

4. A method as claimed in claim 1, further comprising:

(e) repeating said steps (a) to (d) a first predetermined number of transitions of the oxygen concentration of the exhaust gas from the third oxygen concentration to a fourth oxygen rich concentration;

(f) summing the integrals to form a first sum;

(g) correcting the first sum for engine load so as to form a corrected value;

(h) subtracting the corrected value from a first predetermined value to form a first difference;

(i) repeating said steps (a) to (h) a second predetermined number of times;

(j) summing the first differences to form a second sum; and (k) indicating the catalyst to be faulty when the second sum exceeds a second predetermined value.

5. A method as claimed in claim 1, further comprising the preliminary steps of:

perturbing the oxygen concentration of the exhaust gas entering the catalyst between a fifth oxygen rich concentration and a sixth oxygen deficient concentration for a third predetermined number of times;

measuring a first number of times the oxygen concentration of the exhaust gas leaving the catalyst changes between a seventh oxygen rich concentration and an eighth oxygen deficient concentration;

forming a difference between the third predetermined number and the first number; and performing said steps (a) to (d) if the difference is less than a predetermined difference.

6. An apparatus for monitoring operation of a catalyst acting on an exhaust gas of an internal combustion engine, said apparatus comprising a first exhaust gas oxygen sensor for location downstream of said catalyst, a second exhaust gas oxygen sensor for location upstream of said catalyst, a gas flow estimator for estimating gas flow through said catalyst, a perturber for perturbing an oxygen concentration of the exhaust gas entering the catalyst between a first oxygen rich concentration and a second oxygen deficient concentration, and a data processor responsive to said first and second sensors and said estimator for forming an integral of the oxygen concentration of the exhaust gas leaving the catalyst during a period starting when the oxygen concentration of the exhaust gas entering the catalyst changes from the first concentration to the second concentration and ending when the oxygen concentration of the exhaust gas leaving the catalyst falls below a third oxygen deficient concentration and for correcting the integral for an estimate of the gas flow through the catalyst during the period; wherein the catalyst is arranged to act on the exhaust gas of the internal combustion engine, and the engine is controlled by an engine management system arranged to perturb an air-fuel ratio of the engine such that the catalyst receives, alternatively, an air-rich combusted mixture and an air deficient combusted mixture.

7. An apparatus as claimed in claim 6, in which said data processor is arranged to integrate the output of said first sensor while the output of said first sensor is greater than a first predetermined sensor output value and the output of said second sensor is below a second predetermined sensor output value indicating that the gas entering the catalyst is oxygen deficient.

8. An apparatus as claimed in claim 6, in which an output of said first sensor is clamped between a first level and a second level greater than the first level.

9. An apparatus as claimed in claim 6, in which said data processor is further arranged to monitor the engine load and to initiate the measurement of catalyst performance only when the engine load is substantially constant.

10. An apparatus as claimed in claim 6, in which said data processor is arranged, for a second predetermined number of times, to: form and correct the integral repeatedly to form corrected integrals; sum the corrected integrals to form a first sum; correct the first sum for engine load so as to form a corrected value; and subtract the corrected value from a first predetermined value to form a plurality of first differences, said data processor being further arranged to sum the first differencies to form a second sum and to indicate the catalyst to be faulty when the second sum exceeds a second predetermined value.

11. An apparatus as claimed in claim 6, in which said perturber is arranged to perturb the oxygen concentration of the exhaust gas entering the catalyst between a fifth oxygen rich concentration and a sixth oxygen deficient concentration for a third predetermined number of times and said data processor is arranged to: count a first number of times the oxygen concentration of the exhaust gas leaving the catalyst changes between a seventh oxygen rich concentration and an eighth oxygen deficient concentration; form a difference between the third predetermined number and the first number; and form the integral if the difference is less than a predetermined difference.

* * * * *